(12) United States Patent
McGinn et al.

(10) Patent No.: US 7,955,030 B2
(45) Date of Patent: Jun. 7, 2011

(54) CONTROLLING SEDIMENT

(75) Inventors: John H. McGinn, Sacramento, CA (US); Vincent P. Morris, Alameda, CA (US)

(73) Assignee: Ertec Environmental Systems LLC, Alameda, CA (US)

( * ) Notice: Subject to any disclaimer, the term of this patent is extended or adjusted under 35 U.S.C. 154(b) by 408 days.

(21) Appl. No.: 11/988,335

(22) PCT Filed: Jul. 3, 2006

(86) PCT No.: PCT/US2006/026076
§ 371 (c)(1),
(2), (4) Date: Jan. 4, 2008

(87) PCT Pub. No.: WO2007/005895
PCT Pub. Date: Jan. 11, 2007

(65) Prior Publication Data
US 2009/0148243 A1 Jun. 11, 2009

Related U.S. Application Data

(60) Provisional application No. 60/696,998, filed on Jul. 5, 2005.

(51) Int. Cl.
*E02B 3/00* (2006.01)
(52) U.S. Cl. .............. 405/302.6; 405/302.7; 405/15
(58) Field of Classification Search .......... 405/302.4, 405/302.6, 302.7, 15; 210/162, 170.01, 170.03, 210/170.1; 256/12.5, 13
See application file for complete search history.

(56) References Cited

U.S. PATENT DOCUMENTS

| 1,618,288 A | 5/1928 | Schrank |
| 3,112,262 A | 11/1963 | Parkinson .............. 210/130 |
| 3,455,112 A | 7/1969 | Twele ....................... 61/3 |
| 4,279,535 A | 7/1981 | Gagliardi |

(Continued)

FOREIGN PATENT DOCUMENTS

GB 2171131 8/1986

OTHER PUBLICATIONS

PCT written opinion on international application PCT/US 06/26076, mailed Nov. 26, 2007.

*Primary Examiner* — David J Bagnell
*Assistant Examiner* — Sean Andrish
(74) *Attorney, Agent, or Firm* — T. H. P. Richardson

(57) ABSTRACT

Sediment control devices (SCDs) include an apertured threshold member and an apertured outflow member, and optionally a filter member between the threshold and outflow members. In some SCDs1 the outflow member has a smaller aperture size than the threshold member, or vice versa. In some SCDs, a filter is placed in front of the threshold member. In some SCDs, there is a substantially hollow sediment control chamber (SCC) between the threshold and outflow members; in others, there is little or no hollow space between the threshold and outflow members. The SCDs can be constructed so that they are resistant to damage by wheeled traffic. The SCDs can be used to control sediment in run-off from a construction site, as drain covers, or as retaining members for lawns or planting areas. A number of SCDs can be joined together to form assemblies which are useful for stabilizing a land mass, for example a gully or river bank.

26 Claims, 1 Drawing Sheet

U.S. PATENT DOCUMENTS

| | | | |
|---|---|---|---|
| 4,605,204 A | 8/1986 | Schmansky | |
| 4,721,408 A | 1/1988 | Hewlett | 405/48 |
| 4,854,773 A | 8/1989 | Nicoll | 405/15 |
| 5,108,224 A | 4/1992 | Cabaniss et al. | 405/52 |
| 5,257,878 A | 11/1993 | Peterson | 405/15 |
| 5,338,131 A | 8/1994 | Bestmann | 405/24 |
| 5,575,584 A | 11/1996 | Alsop | 405/24 |
| 5,605,416 A | 2/1997 | Roche | |
| 5,632,888 A | 5/1997 | Chinn et al. | 210/163 |
| 5,733,825 A | 3/1998 | Martin et al. | 428/372 |
| 5,944,443 A | 8/1999 | Benedict | |
| 5,954,451 A | 9/1999 | Presby | 405/49 |
| 5,954,952 A | 9/1999 | Strawser | 210/164 |
| 5,961,099 A * | 10/1999 | Thommen, Jr. | 256/12.5 |
| 6,017,166 A | 1/2000 | Mossburg | 404/5 |
| 6,109,835 A | 8/2000 | Grabhorn | 405/302.6 |
| 6,214,216 B1 | 4/2001 | Isaacson | 404/4 |
| 6,277,473 B1 | 8/2001 | McGinn | 428/188 |
| 6,332,737 B1 | 12/2001 | Mattson | 405/63 |
| 6,422,787 B1 * | 7/2002 | Mikell | 405/15 |
| 6,497,532 B1 | 12/2002 | McGinn | 405/27 |
| 6,505,996 B1 | 1/2003 | Ianello et al. | 405/36 |
| 6,547,493 B2 | 4/2003 | Spangler et al. | 405/302.6 |
| 6,551,505 B2 | 4/2003 | Chinn et al. | 210/164 |
| 6,641,335 B1 | 11/2003 | Allard | 405/302.6 |
| 6,709,579 B1 | 3/2004 | Singleton et al. | 404/4 |
| 6,733,209 B2 | 5/2004 | Allard | 405/302.6 |
| 6,811,708 B2 | 11/2004 | Shaw et al. | 210/747 |
| 6,848,866 B1 | 2/2005 | McGinn | 405/302.6 |
| 6,905,289 B1 | 6/2005 | Sanguinetti | 405/302.6 |
| 6,929,425 B1 | 8/2005 | Kimberlin et al. | 405/302.4 |
| 6,974,540 B1 | 12/2005 | Fleischman | 404/4 |
| 7,736,097 B2 * | 6/2010 | D'Andreta et al. | 405/302.6 |
| 2002/0020658 A1 | 2/2002 | Isaacson | 404/4 |
| 2003/0095833 A1 | 5/2003 | Janz | 403/410 |
| 2003/0143026 A1 | 7/2003 | Santha | 405/15 |
| 2006/0133897 A1 * | 6/2006 | Allard et al. | 405/43 |

* cited by examiner

CONTROLLING SEDIMENT

CROSS-REFERENCE TO RELATED APPLICATIONS

This application is an application under 35 USC 371 based on PCT/US06/26076, filed Jul. 3, 2006, and claims priority from U.S. provisional patent application No. 60/696,998, filed 5 Jul. 2005, by John H. McGinn and Vincent P. Morris.

This application is related to U.S. Pat. Nos. 6,848,866 (McGinn) and 7,008,144 (McGinn); U.S. patent application Ser. Nos. 11/127,614 filed May 11, 2005, by John H. McGinn (publication number US-2006-0002773), now U.S. Pat. No. 7,131,787, and Ser. No. 11/333,825, filed Jan. 17, 2006, by John H. McGinn and Vince Morris; now U.S. Pat. No. 7,544,016. The entire disclosure of each of those patents and applications is incorporated herein by reference for all purposes.

BACKGROUND OF THE INVENTION

The patents and applications referenced above describe sediment control devices (SCDs) and their use to collect sediment from liquids in which the sediment is suspended.

SUMMARY OF THE INVENTION

In a first aspect, this invention provides novel assemblies which comprise
(1) an elongate channel along a boundary of an area of ground, and
(2) a sediment control device (SCD) which comprises
  (a) a substantially planar seat portion which fits into the channel, and
  (b) a substantially planar free portion which extends upwards from the channel and which comprises
    (i) an elongate threshold member,
    (ii) an elongate outflow member, and
    (iii)) an elongate filter member between the threshold and outflow members,
    the threshold and outflow members being secured together so that any hollow space between them is less than 30% of the total volume of the SCD,
    each of the threshold and outflow members having multiple relatively large apertures therethrough, and
    the filter member having multiple relatively small apertures therethrough, the relatively small apertures being smaller than the relatively large apertures;
  the seat portion and the free portion being substantially coplanar.

The seat portion of the SCD can comprise first and second elongate apertured members which are adjacent to each other with little or no hollow space between them, and optionally an elongate filter member between them. The first and second members of the seat portion can be the same as, e.g. extensions of, the threshold and outflow members of the free portion.

In a second aspect, this invention provides a novel method of retarding the transfer of sediment across a boundary of an area of ground, the method comprising.
(A) providing a channel in the ground the boundary;
(B) providing a sediment control device (SCD) as defined in the first aspect of the invention; and
(C) locating the SCD so that the seat portion fits into the channel, and the free portion extends upwards from the channel.

The assemblies of the invention are particularly, but not exclusively, useful when the SCD controls run-off from a construction site, prevents sediment from passing into a drain, or serves as a curb or retaining member to define an area, e.g. a lawn or planting area, and prevents sediment for being washed into and/or out of the area.

In particular embodiments of the invention,
(a) the elongate threshold member comprises an apertured sheet comprising a plurality of relatively large threshold apertures, each threshold aperture for example having an area of 0.01 to 1.0 in.$^2$ (6.5 to 650 mm$^2$), preferably 0.02 to 0.25 in.$^2$ (13 to 160 mm$^2$);
(b) the elongate outflow member comprises an apertured sheet comprising a plurality of relatively large outflow apertures, each outflow aperture having for example an area of 0.01 to 1.0 in.$^2$ (6.5 to 650 mm$^2$), preferably 0.02 to 0.25 in.$^2$ (13 to 160 mm$^2$);
(c) the area of the apertures in the second elongate member of less than 0.45 times, e.g. 0.2 to 0.4 times, the area of the apertures in the first elongate member; and
(d) the elongate filter comprises a plurality of relatively small filter apertures, for example a filter member having a mesh size (measured by ASTM E 11) of 80 to 600 micron, e.g. 100 to 500 micron.

As noted above, the threshold and outflow members are secured together so that there is substantially no hollow space between them or, if there is hollow space between them (i.e. unobstructed volume between them) the hollow space is less than 30%, or less than 20%, or less than 10%, or less than 5%, of the total volume of the SCD.

In the assemblies of the invention, the channel in the ground can for example be a channel created by pressing the SCD into the ground, optionally accompanied by reciprocal horizontal movement of the SCD. In the assemblies of the invention, the free portion of the SCD can consist essentially of the threshold member, preferably a planar threshold member, the outflow member, preferably a planar threshold member, and the filter member between the threshold and outflow members. The bottom edge of the seat portion of the SCD can for example have a jagged edge formed by cutting an apertured material which is part of the threshold member and/or the outflow member.

BRIEF DESCRIPTION OF THE DRAWINGS

The invention is illustrated in the accompanying drawings, in which the FIGURE is a diagrammatic sketch, not to scale, of an assembly of the invention.

DETAILED DESCRIPTION OF THE INVENTION

Figure 1:
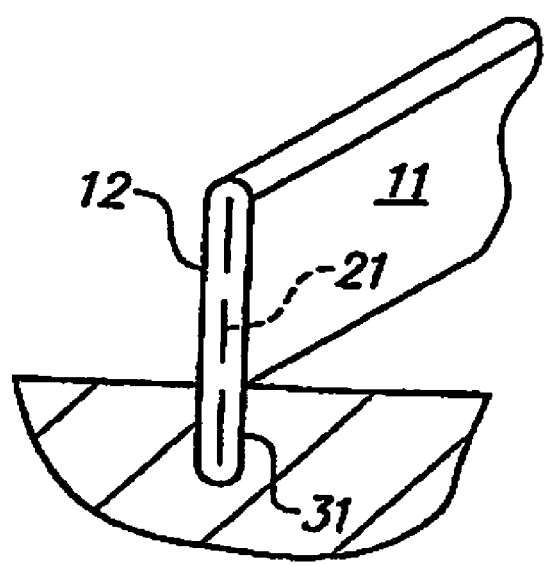

In the Summary of the Invention above, the Detailed Description of the Invention, and the claims below, and the accompanying drawings, reference is made to particular features (including for example components, ingredients, elements, devices, apparatus, systems, groups, ranges, method steps, test results, etc.) of the invention. It is to be understood that the disclosure of the invention in this specification includes all possible combinations of such particular features. For example, where a particular feature is disclosed in the context of a particular aspect, a particular embodiment, a particular claim, or a particular FIGURE, that feature can also be used, to the extent appropriate, in the context of other particular aspects, embodiments, claims and Figures, and in the invention generally.

The invention disclosed and claimed herein includes embodiments not specifically described herein, and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, an SCD "comprising" (or "which comprises") components A, B and C can contain only components A, B and C, or can contain not only components A, B and C but also one or more other components. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example, "an area of 0.01 to 1.0 in.$^2$" means an area whose lower limit is 0.01 in.$^2$ and whose upper limit is 1.0 in.$^2$. The terms "plural", "multiple", "plurality" and "multiplicity" are used herein to denote two or more than two features.

Where reference is made herein to "a" or "an" feature, this includes the possibility that there are two or more such features (except where the context excludes that possibility). Where reference is made herein to two or more features, this includes the possibility that the two or more features are replaced by a lesser number or greater number of features providing the same function (except where the context excludes that possibility). The numbers given herein should be construed with the latitude appropriate to their context and expression; for example, each number is subject to variation which depends on the accuracy with which it can be measured by methods conventionally used by those skilled in the art.

The term "sediment" is used herein to denote solid particulate material, e.g. soil, sand, decomposed granite or pebbles, which can become suspended, or which is suspended, in a flowing stream of liquid, and which will settle out of the liquid when the liquid ceases to flow. The term "sediment control device" (often abbreviated herein to SCD) is used herein to denote an article which can be transported and placed on top of the ground, with a seat portion of the SCD being below the s ground, in order to collect sediment from a sediment-bearing stream of liquid, usually water, which passes through the SCD.

Where reference is made herein to apertured sheets, all the apertures in any particular sheet will generally be of the same size. If they are not, the aperture size referred to is the arithmetic average of the different sizes.

Except where the disclosure this specification is at variance with the disclosure in the patents and applications incorporated by reference herein, the disclosure in those patents and applications is also applicable, mutatis mutandis, to the present invention. For example, the threshold, outflow and filter members can be composed of the same materials as those disclosed in U.S. Pat. No. 6,848,866 (in particular at column 4, line 37, to column 7, line 53). The SCDs can be manufactured as described in U.S. Pat. No. 6,848,866 (in particular at column 10, lines 3-40); and two or more SCDs can be joined end-to-end or side-by-side by the methods disclosed in U.S. Pat. No. 6,848,866 (in particular at column 9, line 27, to column 10, line 2).

Also, as disclosed in U.S. Pat. No. 6,848,866, the SCDs used this invention can optionally have one or more of the following characteristics.

1. Each of the threshold member and the outflow member, which can be the same or different, has a multitude of apertures therethrough, each of the apertures having an area of 0.01 to 1.0 in.$^2$.
2. Each of the threshold member and the outflow member, which can be the same or different, is composed of a multiplicity of polymeric strands.
3. The threshold member and the outflow member are different parts of a single piece of apertured polymeric material.
4. The filter member has a mesh size of 80 to 600 micron.
5. The parts of the sediment control roll are constructed so that the SCD does not absorb substantial quantities of water. For example, it is preferred that the SCD, when subjected to a test which consists of
    (i) completely immersing the SCD in water for 0.5 hour,
    (ii) removing the SCD from the water,
    (iii) placing the SCD on a horizontal apertured surface, and
    (iv) leaving the SCD to drain for 0.5 hour in still air at 20° C.,
    has a weight after the test which is not more than 1.3 times, preferably not more than 1.1 times, its weight before the test.
6. The SCD is constructed so that, in a test in which clean water is directed towards the SCD at right angles to the threshold member, the SCD is capable of passing at least 100, e.g. at least 200, gallons of water, but not more than 400 gallons of water, per square foot per minute of the frontal area of the threshold member (i.e. the area of the threshold member as viewed from the front. In such a test (and indeed likewise in practice) the structure of the SCD is generally such that the volumes of water entering and leaving any particular length of the SCD are substantially the same (e.g. do not differ by more than 20%, based on the volume of water entering the SCD), since the SCD does not function as a pipe to direct liquid to the ends of the roll.
7. The dry weight of the SCD is such that it can readily be transported and placed in position manually. The weight may be for example 0.5 to 2.5, e.g. 0.65 to 1.8, lb/ft, with a total weight of for example 2 to 20 lb., preferably less than 10 lb.

The Drawings

Referring now to the drawings, the FIGURE shows an SCD having a free portion consisting of threshold member 12, outflow member 11 and filter member 21, and a seat portion which fits into channel 31 in the ground.

The invention claimed is:

1. An assembly which comprises
   (1) an elongate channel along a boundary of an area of ground, and
   (2) a sediment control device (SCD) which comprises
      (a) a substantially planar seat portion which fits into the channel, and
      (b) a substantially planar free portion which extends upwards from the channel and which comprises (i) an elongate threshold member,
(ii) an elongate outflow member, and
(iii)) an elongate filter member between the threshold and outflow members,
the SCD having a total volume, and
the threshold and outflow members being secured together so that any hollow space between the threshold and outflow members is less than 30% of the total volume of the SCD,
each of the threshold and outflow members having multiple relatively large apertures therethrough,
the filter member having multiple relatively small apertures therethrough, the relatively small apertures being smaller than the relatively large apertures, and
the seat portion and the free portion being substantially coplanar.

2. An assembly according to claim 1 wherein there is substantially no hollow space between the threshold member and the outflow member.

3. An assembly according to claim 1 wherein each of the threshold member and the outflow member is composed of a multiplicity of polymeric strands.

4. An assembly according to claim 1 wherein the threshold member and the outflow member are different parts of a single piece of apertured polymeric material.

5. An assembly according to claim 1 wherein the size of the relatively large apertures in the threshold member is substantially different from the size of the relatively large apertures in the outflow member.

6. An assembly according to claim 5 wherein the apertures in the outflow member have a first area and the apertures in the threshold member have a second area, and the first area is substantially less than the second area.

7. An assembly according to claim 6 wherein the first area is less than 0.45 times the second area.

8. An assembly according to claim 1 wherein the free portion of the SCD consists essentially of the threshold member, the outflow member and the filter member, and there is substantially no hollow space between the threshold member and the outflow member.

9. An assembly according to claim 8 wherein each of the threshold member, the outflow member and the filter member is substantially planar.

10. An assembly according to claim 9 wherein the apertures in the threshold and outflow members have an area of 0.01 to 1.0 in.$^2$, and the filter member has a mesh size of 80 to 600 micron.

11. An assembly according to claim 1 wherein the seat portion comprises a first member which is an extension of the threshold member and a second member which is an extension of the outflow member, and there is substantially no hollow space between the first member and the second member.

12. An assembly according to claim 1 wherein the SCD, when subjected to a test which consists of
   (i) completely immersing the SCD in water for 0.5 hour,
   (ii) removing the SCD from the water,
   (iii) placing the SCD on a horizontal apertured surface, and
   (iv) leaving the SCD to drain for 0.5 hour in still air at 20° C., has a weight after the test which is not more than 1.1 times the weight of the SCD before the test.

13. An assembly according to claim 1 wherein the SCD, when subjected to a test in which clean water is directed towards the SCD at right angles to the threshold member, is capable of passing 200-400 gallons of water per square foot per minute of the area of the threshold member, and the volumes of water entering and leaving any particular length of the SCD do not differ by more than 20%, based on the volume of water entering the particular length of the SCD.

14. A method of retarding the transfer of sediment across a boundary of an area of ground, the method comprising
   (A) providing a channel in the ground at the boundary;
   (B) providing a sediment control device (SCD) which comprises
      (a) a substantially planar seat portion, and
      (b) a substantially planar free portion which comprises
         (i) an elongate threshold member,
         (ii) an elongate outflow member, and
         (iii)) an elongate filter member between the threshold and outflow members,
      the SCD having a total volume, and
      the threshold and outflow members being secured together so that any hollow space between the threshold and outflow members is less than 30% of the total volume of the SCD,
      each of the threshold and outflow members having multiple relatively large apertures therethrough,
      the filter member having relatively small apertures therethrough, the relatively small apertures being smaller than the relatively large apertures, and
      the seat portion and the free portion being substantially coplanar
   (C) locating the SCD so that the seat portion fits into the channel, and the free portion extends upwards from the channel.

15. A method according to claim 14 wherein there is substantially no hollow space between the threshold member and the outflow member.

16. A method according to claim 14 wherein each of the threshold member and the outflow member is composed of a multiplicity of polymeric strands.

17. A method according to claim 16 wherein the threshold member and the outflow member are different parts of a single piece of apertured polymeric material.

18. A method according to claim 14 wherein the size of the relatively large apertures in the threshold member is substantially different from the size of the relatively large apertures in the outflow member.

19. A method according to claim 14 wherein the free portion of the SCD consists essentially of the threshold member, the outflow member and the filter member, and there is substantially no hollow space between the threshold member and the outflow member.

20. A method according to claim 19 wherein each of the threshold member, the outflow member and the filter member is substantially planar.

21. A method according to claim 20 wherein the apertures in the threshold and outflow members have an area of 0.01 to 1.0 in.$^2$, and the filter member has a mesh size of 80 to 600 micron.

22. An assembly which comprises
   (1) an elongate channel along a boundary of an area of ground, and
   (2) a sediment control device (SCD) which consists essentially of
      (a) a substantially planar and substantially vertical seat portion which fits into the channel, and
      (b) a substantially planar and substantially vertical free portion which extends upwards from the channel and which comprises
         (i) a substantially planar elongate threshold member,
         (ii) a substantially planar elongate outflow member, and (iii)) a substantially planar elongate filter member between the threshold and outflow members, the threshold and outflow members being secured together so that there is substantially no hollow space between the threshold and outflow members, each of the threshold and outflow members having multiple apertures therethrough, the apertures having an area of 0.01 to 1.0 in.$^2$, and the filter member having a mesh size of 80 to 600 micron.

23. An assembly according to claim 22 wherein each of the threshold member and the outflow member is composed of a multiplicity of polymeric strands.

24. An assembly according to claim 22 wherein the threshold member and the outflow member are different parts of a single piece of apertured polymeric material.

25. An assembly according to claim 22 wherein the size of the apertures in the threshold member is substantially larger than the size of the apertures in the outflow member.

26. An assembly according to claim 22 wherein the seat portion comprises a first member which is an extension of the threshold member and a second member which is an extension of the outflow member, and there is substantially no hollow space between the first member and the second member.

* * * * *